United States Patent
Kanada et al.

(10) Patent No.: US 10,381,855 B2
(45) Date of Patent: Aug. 13, 2019

(54) SECONDARY BATTERY SYSTEM USING TEMPERATURE THRESHOLD IN RESPONSE TO LITHIUM ION CONCENTRATIONS

(71) Applicant: TOYOTA JIDOSHA KABUSHIKI KAISHA, Toyota-shi, Aichi-ken (JP)

(72) Inventors: Ryo Kanada, Toyota (JP); Shohei Matsuoka, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/439,171

(22) Filed: Feb. 22, 2017

(65) Prior Publication Data
US 2017/0250543 A1     Aug. 31, 2017

(30) Foreign Application Priority Data

Feb. 26, 2016 (JP) ................. 2016-035619

(51) Int. Cl.
*H02J 7/00* (2006.01)
*H01M 10/0525* (2010.01)
*H01M 10/44* (2006.01)
*H01M 10/48* (2006.01)
*H01M 10/42* (2006.01)

(52) U.S. Cl.
CPC ......... *H02J 7/007* (2013.01); *H01M 10/0525* (2013.01); *H01M 10/443* (2013.01); *H01M 10/48* (2013.01); *H01M 10/484* (2013.01); *H02J 7/0029* (2013.01); *H02J 7/0042* (2013.01); *H02J 7/0047* (2013.01); *H02J 7/0091* (2013.01); *H01M 2010/4271* (2013.01);
(Continued)

(58) Field of Classification Search
CPC .... H02J 7/007; H02J 7/0042; H01M 10/0525; H01M 10/443; H01M 10/484; H01M 2010/4271; H01M 2220/20
USPC .................................. 320/134, 150, 153
See application file for complete search history.

(56) References Cited

U.S. PATENT DOCUMENTS

| 4,440,602 A * | 4/1984 | Dobson .............. G01N 27/4166 204/416 |
| 2009/0015209 A1* | 1/2009 | Morina ................. H02J 7/0013 320/153 |

(Continued)

FOREIGN PATENT DOCUMENTS

| CN | 101345432 A | 1/2009 |
| CN | 104956538 A | 9/2015 |

(Continued)

*Primary Examiner* — Nathaniel R Pelton
(74) *Attorney, Agent, or Firm* — Sughrue Mion, PLLC

(57) ABSTRACT

A secondary battery system includes a battery having an electrode body impregnated with an electrolyte containing lithium ions; and an ECU configured to permit charge and discharge of the battery when battery temperature is equal to or more than a threshold temperature and to restrict the charge and discharge of the battery when the battery temperature is less than the threshold temperature. The ECU is configured to obtain a value related to minimum concentration of the lithium ions (minimum salt concentration) caused by a deviation of concentration distribution of the lithium ions in the electrode body, and to set the threshold temperature to be higher as the related value representing the minimum salt concentration becomes lower.

4 Claims, 15 Drawing Sheets

(52) U.S. Cl.
CPC ........ *H01M 2220/20* (2013.01); *Y02E 60/122* (2013.01); *Y02T 10/7011* (2013.01)

(56) References Cited

U.S. PATENT DOCUMENTS

| | | |
|---|---|---|
| 2014/0225571 A1 | 8/2014 | Obata et al. |
| 2015/0054449 A1* | 2/2015 | Takano ............... H01M 10/443 320/107 |
| 2015/0338468 A1* | 11/2015 | Kaiya ...................... H02J 7/00 324/432 |

FOREIGN PATENT DOCUMENTS

| | | |
|---|---|---|
| JP | 2013-125713 A | 6/2013 |
| JP | 2013-183523 A | 9/2013 |
| JP | 2014-207107 A | 10/2014 |
| JP | 2015-127991 A | 7/2015 |
| JP | 2015-131573 A | 7/2015 |
| KR | 10-2014-0066729 A | 6/2014 |
| KR | 10-2015-0095803 A | 8/2015 |
| WO | 2013/046263 A1 | 4/2013 |
| WO | 2015/097516 A1 | 7/2015 |

\* cited by examiner

SECONDARY BATTERY SYSTEM USING TEMPERATURE THRESHOLD IN RESPONSE TO LITHIUM ION CONCENTRATIONS

INCORPORATION BY REFERENCE

The disclosure of Japanese Patent Application No. 2016-035619 filed on Feb. 26, 2016 including the specification, drawings and abstract is incorporated herein by reference in its entirety.

BACKGROUND

1. Technical Field

The present disclosure relates to secondary battery systems, and more particularly relates to charge and discharge control of a secondary battery system including a secondary battery (lithium-ion secondary battery) having an electrode body impregnated with an electrolyte containing lithium ions.

2. Description of Related Art

In recent years, a secondary battery system incorporating as a battery a lithium-ion secondary battery is widespread. In such a secondary battery system, an electrolyte of the battery can be solidified (frozen) under very low temperature environment. When the electrolyte is solidified, it is desirable to restrict charge and discharge of the battery in order to protect the battery. For example, in a motor vehicle disclosed in Japanese Patent Application Publication No. 2013-183523, a relay is opened at temperatures equal to or below a freezing point of the electrolyte so as to electrically disconnect the battery from an external power supply and electric loads.

SUMMARY

As a measure for protecting the battery, it is considered to set "threshold temperature" and determine whether or not to restrict charge and discharge of the battery based on comparison between the temperature of the battery and the threshold temperature. That is, when the temperature of the battery is equal to or more than the threshold temperature, it is determined that the electrolyte is not solidified and therefore the charge and discharge of the battery are permitted, whereas when the temperature of the battery is less than the threshold temperature, it is determined that at least part of the electrolyte is solidified and therefore the charge and discharge of the battery are restricted.

Generally, in a battery configured to include a lithium-ion secondary battery, concentration distribution of lithium ions in the electrolyte may be deviated when charge and discharge in a large current is continuously performed. In setting the threshold temperature, it is possible to use a fixed value (a value preset in accordance with a battery configuration) without consideration of the deviation in the concentration distribution of the lithium ions.

However, in the case where the fixed value is used and the threshold temperature is set to be too high, there is a possibility that charge and discharge of the battery may not be permitted although the electrolyte is not at all solidified (i.e., a possibility that charge and discharge of the battery may excessively be restricted). In contrast, when the threshold temperature is set to be too low, there is a possibility that the charge and discharge of the battery may be performed although the electrolyte has a solidified region, which may result in further deterioration of the battery.

The present disclosure provides a technology for a secondary battery system including a battery configured to include a lithium-ion secondary battery, the technology being configured to suppress deterioration of the battery while avoiding excessive restriction of charge and discharge of the battery.

An aspect of the present disclosure relates to a secondary battery system including: a secondary battery having an electrode body impregnated with an electrolyte containing lithium ions; and a control unit configured to permit charge and discharge of the secondary battery when temperature of the secondary battery is equal to or more than a threshold temperature and to restrict the charge and discharge of the secondary battery when the temperature of the secondary battery is less than the threshold temperature. The control unit is configured to obtain a value related to a minimum concentration of the lithium ions caused by a deviation of concentration distribution of the lithium ions in the electrode body, and to set the threshold temperature to be higher as an amount of decrease in the minimum concentration becomes larger, the amount of decrease being represented by the related value.

The control unit may be configured to calculate, based on a charge and discharge history of the secondary battery, an evaluation value representing a deteriorating degree of the secondary battery attributed to the deviation of the concentration distribution caused by the charge and discharge of the secondary battery, and to set the threshold temperature to be higher as the evaluation value is larger.

The secondary battery may further include: a battery casing that houses the electrode body; and a surface pressure sensor that measures surface pressure on a surface of the battery casing. The control unit may be configured to set the threshold temperature to be higher as the surface pressure is higher.

The control unit may be configured to calculate a flow velocity of the electrolyte using a liquid flow equation that defines a flow of the electrolyte, to calculate the concentration distribution from the flow velocity, and to calculate the minimum concentration from the calculated concentration distribution.

According to the configuration, the evaluation value representing the deteriorating degree (so-called a degree of high-rate deterioration) of the secondary battery, or the surface pressure measured with the surface pressure sensor is calculated as a value related to the minimum concentration. Or the minimum concentration is directly calculated using the liquid flow equation. As the minimum concentration is lower, the threshold temperature is set to be higher.

According to the principle of freezing-point depression, when the concentration of a solute added to a solvent is higher, the amount of depression of the freezing point becomes larger and the freezing point becomes lower. Accordingly, when a deviation is generated in concentration (salt concentration) distribution of lithium ions in the electrolyte, the freezing point may be different for each region of the electrolyte. That is, while a region with an increased salt concentration has a depression in the freezing point, a region with a decreased salt concentration has a rise in the freezing point. Accordingly, with temperature fall in the secondary battery, the electrolyte may possibly start to have a local solidification at a region where the salt concentration is relatively low.

According to the configuration, the threshold temperature is set in accordance with the minimum concentration, which is the concentration of a region where solidification of the electrolyte is most likely to occur. When the threshold temperature is equal to or more than the temperature of the secondary battery, it is determined that the electrolyte is not solidified at all, and so the charge and discharge of the secondary battery are permitted. Accordingly, excessive restriction of the charge and discharge of the battery can be avoided. On the contrary, when the temperature of the secondary battery is less than the threshold temperature (i.e., the temperature set in accordance with the concentration of a region where solidification of the electrolyte is most likely to occur), it is determined at least part of the electrolyte is possibly solidified, and so the charge and discharge of the secondary battery are restricted (for example, prohibited). As a result, deterioration of the secondary battery can be suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
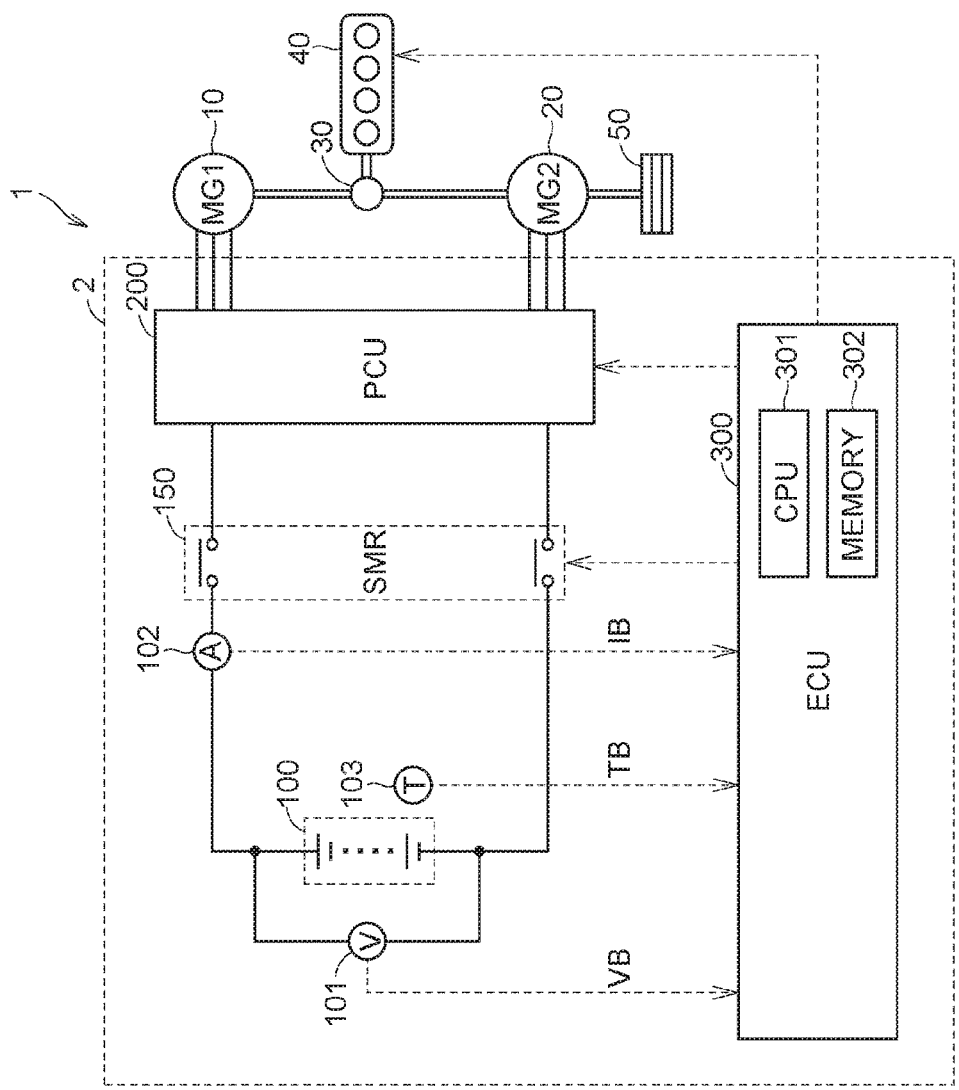
FIG. 1 is a block diagram schematically illustrating an overall configuration of a vehicle incorporating a secondary battery system according to a first embodiment.

Hereinafter, embodiments of the present disclosure will be described in detail with reference to the drawings. Note that identical or like component members are designated by identical reference numerals to avoid repetition of the description thereof.

In the embodiments of the present disclosure described below, the configuration in which a secondary battery system is incorporated in a hybrid vehicle will be described as an example. However, the vehicle that can incorporate the secondary battery system according to the present disclosure is not limited to the hybrid vehicles but may be electric vehicles or fuel cell vehicles. The secondary battery system according to the present disclosure may be applied not only as the system of the vehicles but also as a stationary system.

First Embodiment

<Configuration of Hybrid Vehicle>

FIG. 1 is a block diagram schematically illustrating an overall configuration of a hybrid vehicle incorporating a secondary battery system according to the first embodiment. A vehicle 1 includes a secondary battery system 2, motor generators (MG) 10, 20, a drive division mechanism 30, an engine 40, and driving wheels 50. The secondary battery system 2 includes a battery 100, a system main relay (SMR) 150, a power control unit (PCU) 200, and an electronic control unit (ECU) 300.

The motor generators 10, 20 are each a three-phase AC dynamo-electric machine. The motor generator 10 is coupled with a crankshaft of the engine 40 through the drive division mechanism 30. At the time of starting the engine 40, the motor generator 10 rotates the crankshaft of the engine 40 using electric power of the battery 100. The motor generator 10 can also generate electric power using motive power of the engine 40. The AC power generated by the motor generator 10 is converted into DC power by a PCU 200, and is used to charge the battery 100. The AC power generated by the motor generator 10 may be supplied to the motor generator 20.

The motor generator 20 rotates the driving shaft using at least one of the electric power from the battery 100 and the electric power generated by the motor generator 10. The motor generator 20 can also generate electric power through regenerative braking. The AC power generated by the motor generator 20 is converted into DC power by the PCU 200, and is used to charge the battery 100.

The drive division mechanism 30 is, for example, a planetary gear mechanism, which mechanically couples three elements including the crankshaft of the engine 40, the rotating shaft of the motor generator 10, and a driving shaft. The engine 40 is an internal combustion engine, such as a gasoline engine, which generates driving force for travel of the vehicle 1 in response to a control signal from the ECU 300.

The PCU 200 includes an inverter and a converter which are not illustrated. The inverter is a general three-phase inverter. The converter boosts a voltage supplied from the battery 100 and supplies the voltage to the inverter during boosting operation. The converter steps down the voltage supplied from the inverter and charges the battery 100 during step-down operation. The SMR 150 is electrically connected to a current path that connects the battery 100 and the PCU 200. When the SMR 150 is closed in response to a control signal from the ECU 300, electric power may be transferred between the battery 100 and the PCU 200.

The battery 100, which includes a lithium-ion secondary battery, is a rechargeably-configured DC power supply. The configuration of the battery 100 will be described in detail in FIGS. 2 and 3. The battery 100 is equipped with a voltage sensor 101, a current sensor 102, and a temperature sensor 103. The voltage sensor 101 detects a voltage VB of the battery 100. The current sensor 102 detects an electric current IB input to and output from the battery 100. The temperature sensor 103 detects temperature (which is also hereinafter stated as "battery temperature TB") of the battery 100. Each of the sensors outputs a detection result to the ECU 300. The ECU 300 calculates a state of charge (SOC) of the battery 100 based on the result of detection by each of the sensors.

The ECU 300 is configured to include a central processing unit (CPU) 301, a memory 302, and an input-output buffer (not illustrated). The ECU 300 controls each unit so that the vehicle 1 is in a desired state based on signals received from each sensor and on maps and programs stored in the memory 302. The charge and discharge control of the battery 100, which is one of the main control executed by the ECU 300, will be described in detail later.

<Configuration of Battery>

Figure 2:
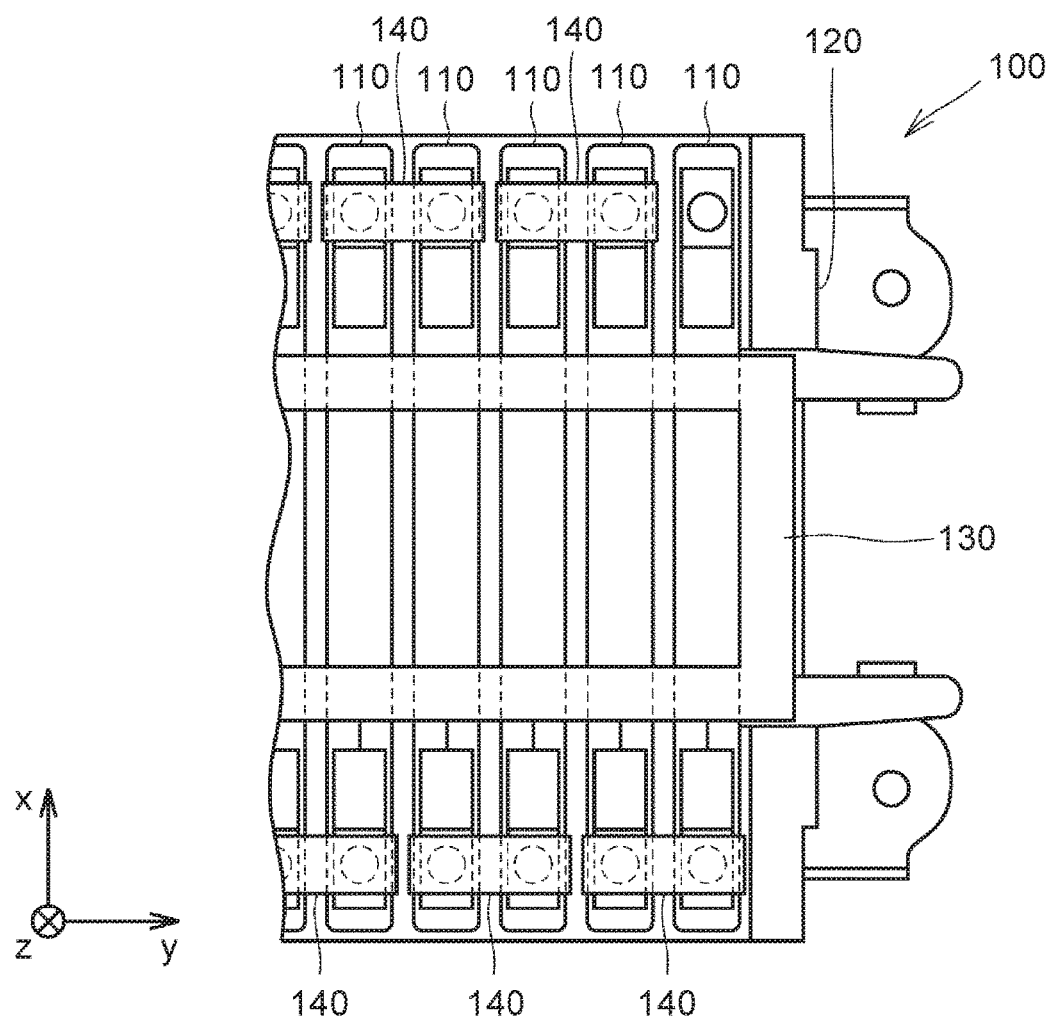
FIG. 2 illustrates a configuration of a battery in more detail.

FIG. 2 illustrates the configuration of the battery 100 in more detail. The battery 100 includes a plurality of cells 110, a pair of end plates 120, a binding band 130, and a plurality of bus bars 140.

Each of the plurality of cells 110 has, for example, an approximately rectangular solid form. The plurality of cells 110 are each stacked such that lateral surfaces having a largest area (surfaces parallel to a zx plane in the drawing) face each other with a distance. In FIG. 2, one end in a stacking direction (y direction) of a stacked body is partially illustrated, the stacked body being configured by stacking the plurality of cells 110. The pair of end plates 120 (only one end plate is illustrated in FIG. 2) is disposed so as to face the one end and the other end in the stacking direction of the stacked body, respectively. The binding band 130 binds the pair of end plates 120 with all the cells 110 being interposed therein.

Figure 3:
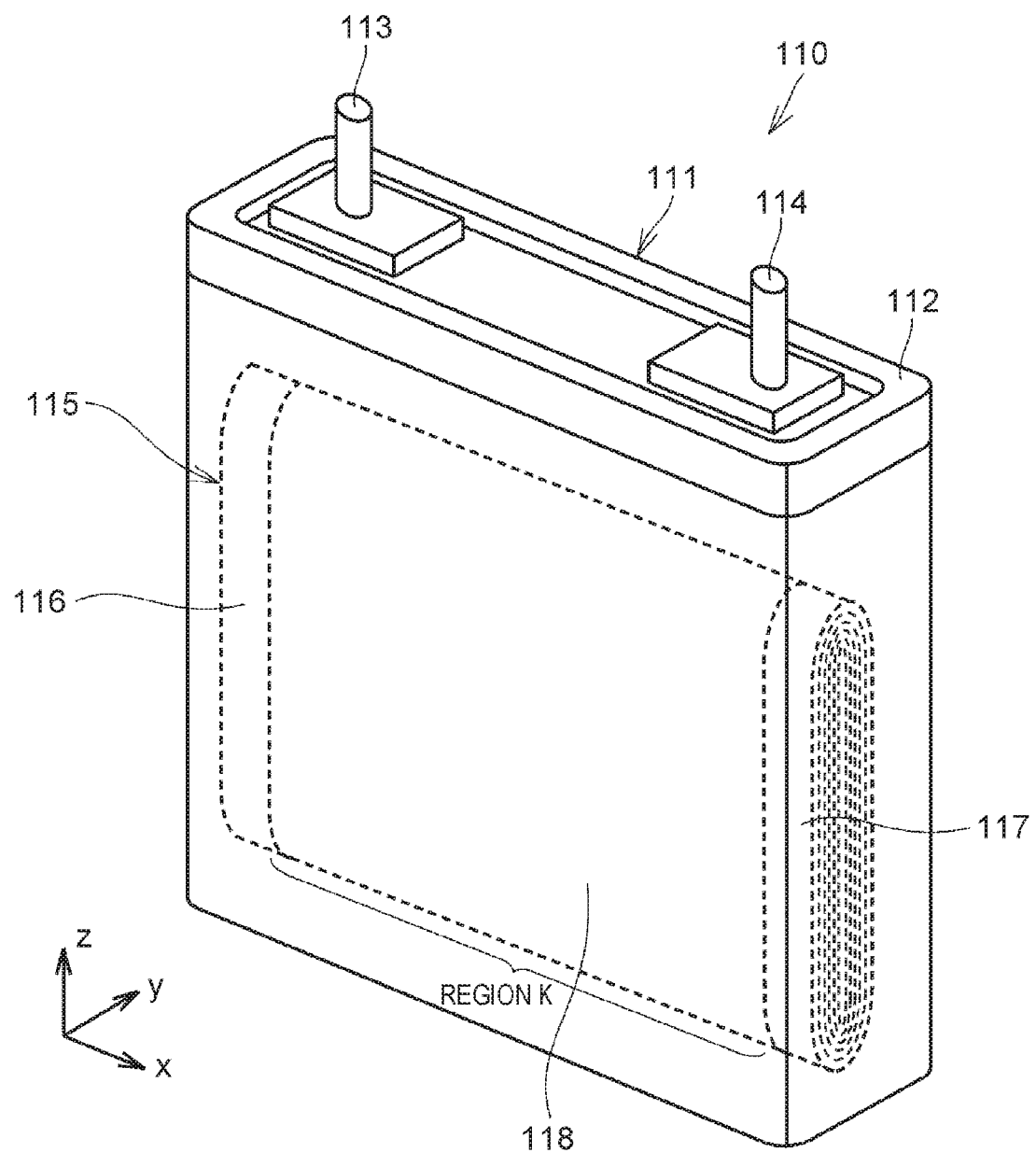
FIG. 3 illustrates a configuration of each cell in more detail.

FIG. 3 illustrates the configuration of each of the cells 110 in more detail. An upper surface of a casing 111 (upper surface in a z-axis direction) of the cells 110 is closed with a lid 112. The lid 112 is provided with a positive electrode terminal 113 and a negative electrode terminal 114. One ends of both the positive electrode terminal 113 and the negative electrode terminal 114 each protrude outward from the lid 112. The positive electrode terminal 113 of one cell is disposed so as to face the negative electrode terminal 114 of an adjacent cell, and these terminals are fastened by the bus bar 140 so as to be electrically connected (see FIG. 2). Accordingly, the plurality of cells 110 are connected with each other in series inside the battery 100. The other end of the positive electrode terminal 113 is electrically connected to an internal positive electrode terminal and the other end of the negative electrode terminal 114 is electrically connected to an internal negative electrode terminal within the casing 111 (both the internal positive and negative electrode terminals are not illustrated).

The casing 111 houses an electrode body 115 (which is illustrated with a broken line with the casing 111 being seen through). The electrode body 115 is formed such that a positive electrode sheet 116 and a negative electrode sheet 117 are laminated through a separator 118 and wound cylindrically around an x-axis direction.

Figure 4:
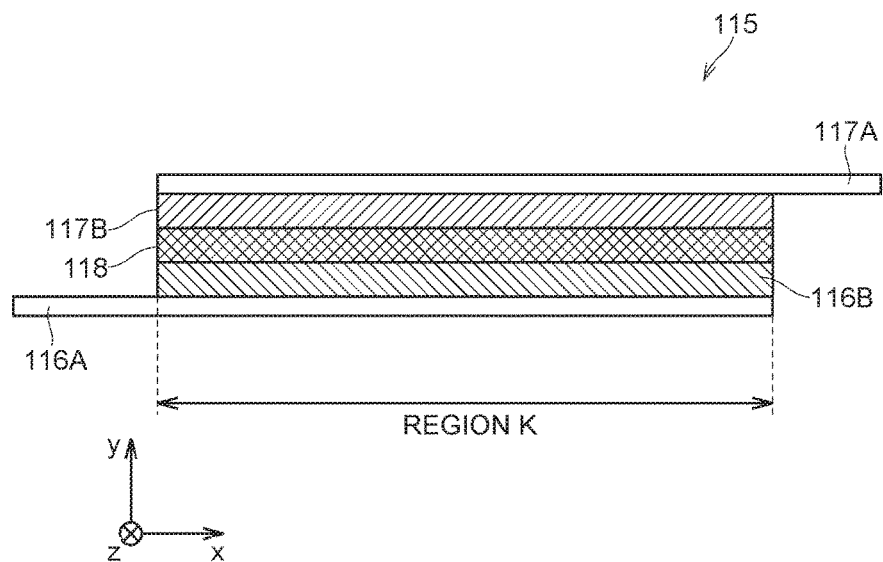
FIG. 4 illustrates a configuration of an electrode body in more detail.

FIG. 4 illustrates the configuration of the electrode body 115 in more detail. An x direction is an in-plane direction of each layer, and a y direction is a lamination direction of each layer. The positive electrode sheet 116 includes a current collecting foil 116A, and a positive electrode active material layer 116B (a layer including a positive active material, a conducting material, and a binder) formed on the surface of the current collecting foil 116A. Similarly, the negative electrode sheet 117 includes a current collecting foil 117A, and a negative electrode active material layer 117B (a layer including a negative electrode active material, a conducting material, and a binder) formed on the surface of the current collecting foil 117A. The separator 118 is provided so as to be in contact with both the positive electrode active material layer 116B and the negative electrode active material layer 117B. A region "K" represents a region where the positive electrode active material layer 116B and the negative electrode active material layer 117B face each other through the separator 118. The positive electrode active material layer 116B, the negative electrode active material layer 117B, and the separator 118 are impregnated with an electrolyte.

As materials of the positive electrode sheet 116, the negative electrode sheet 117, the separator 118, and the electrolyte, various conventional publicly-known materials can be used. Examples of the material of the positive electrode sheet 116 include lithium cobaltite or lithium manganate. Carbon is used for the negative electrode sheet 117. Polyolefin is used for the separator 118. The electrolyte contains an organic solvent, lithium ions, and an additive. The electrode body 115 may be other than the wound body, such as a laminate that is not wound around.

<High-Rate Deterioration Attributed to Deviation of Salt Concentration Distribution>

It is known that in the secondary battery system 2 configured as described in the foregoing, when charge and discharge of the battery 100 are continuously performed in a large current, internal resistance increases in each of the cells 110 so that output voltage from the cells 110 falls. Such deterioration is called "high-rate deterioration." The high-rate deterioration is attributed to deviation in lithium ion concentration distribution (which is hereinafter called "salt concentration distribution" for short) inside the electrode body 115. Although the deviation of the salt concentration distribution may be generated both in the in-plane direction (x direction) and the lamination direction (y direction) of the electrode body 115, the deviation in the in-plane direction is generally more notable than the deviation in the lamination direction. Accordingly, the salt concentration distribution in the in-plane direction will be described below as a typical deviation.

Figure 5:
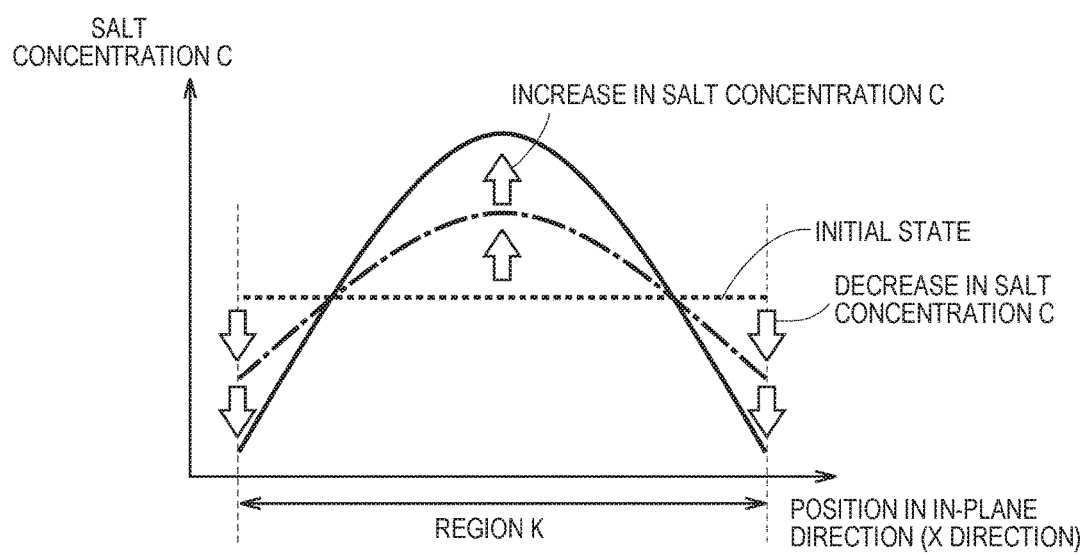
FIG. 5 illustrates one example of salt concentration distribution in an in-plane direction of an electrode body.

FIG. 5 illustrates one example of the salt concentration distribution in the in-plane direction of the electrode body 115. In FIG. 5, a horizontal axis represents a position of the electrode body 115 in the in-plane direction (x direction), while a vertical axis represents salt concentration C.

When the cells 110 are in an initial state (for example, in a state immediately after manufacturing), the salt concentration C is approximately constant. As the high-rate deterioration of the cells 110 progresses due to the cells 110 being continuously charged with a large current, the salt concentration C in the vicinity of the center of the region K increases while the salt concentration C in the vicinity of both ends of the region K decreases. In the case where a large current is continuously discharged from the cells 110, the salt concentration in the vicinity of the center of the region K gradually decreases, while the salt concentration in the vicinity of both the ends of the region K gradually increases contrary to the case of FIG. 5.

<Evaluation Value of High-Rate Deterioration>

The ECU 300 estimates a progress state of the high-rate deterioration based on a charge and discharge history of the battery 100. More specifically, the ECU 300 calculates an evaluation value D for evaluating the degree of high-rate deterioration (in other words, a damage amount) at specified control periods ΔT in consideration of both enlargement and decrease in the deviation of the salt concentration distribution caused by the charge and discharge of the battery 100. Hereinafter, a method for calculating the evaluation value D will be described in detail.

When N represents an integer equal to or more than one, D(N) represents an evaluation value D of the battery 100 calculated at a current (Nth) control period, and D(N−1) represents an evaluation value D calculated at the previous ((N−1)th) control period, the evaluation value D(N) is calculated in accordance with Expression (1) mentioned below. An initial value D(0) of the evaluation value D is set to zero, for example.

$$D(N)=D(N-1)-D(-)+D(+) \quad (1)$$

In Expression (1), a decrement D(−) of the evaluation value D represents decrease in the deviation of the salt concentration distribution due to diffusion of lithium ions during a period from previous evaluation value calculation to current evaluation value calculation (during a control period ΔT). More specifically, the decrement D(−) is calculated with a forgetting coefficient α as in the case of Expression (2) stated below, for example. Note that 0<α×ΔT<1.

$$D(-)=\alpha \times \Delta T \times D(N-1) \quad (2)$$

The forgetting coefficient α, which is a coefficient corresponding to a diffusion rate of the lithium ions in the electrolyte, is dependent on the battery temperature TB and the SOC. Accordingly, correlation of the forgetting coefficient α relative to the battery temperature TB and the SOC is acquired by an experiment or a simulation in advance, and is stored in the memory 302 in the ECU 300 as a map or a transformation.

Figure 6:
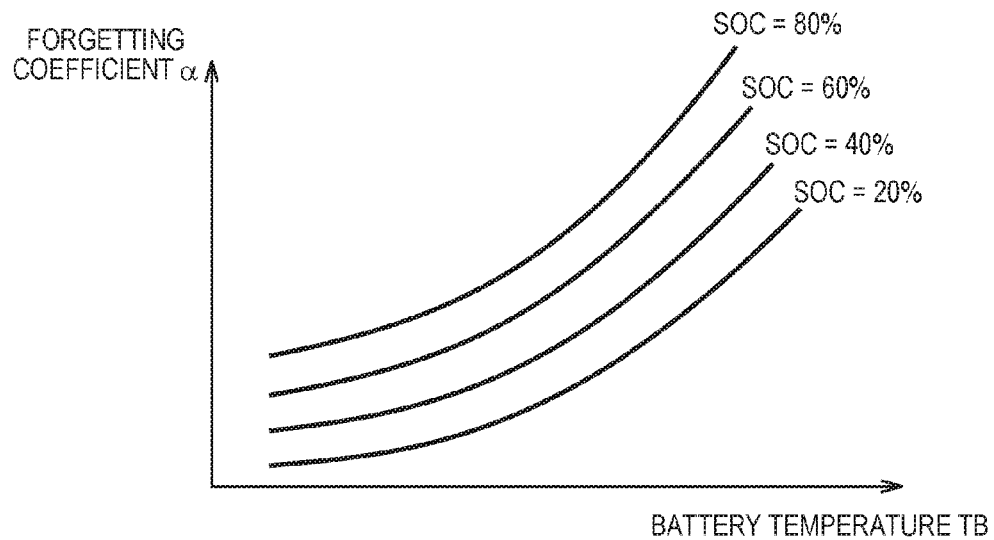
FIG. 6 illustrates one example of a map for calculating a forgetting coefficient.

FIG. 6 illustrates one example of a map for calculating the forgetting coefficient α. In FIG. 6, a horizontal axis represents the battery temperature TB while a vertical axis represents the forgetting coefficient α. When the battery temperature TB is the same, the forgetting coefficient α becomes larger as the SOC becomes higher. When the SOC is the same, the forgetting coefficient α becomes larger as the battery temperature TB becomes higher. That is, the forgetting coefficient α becomes larger, as diffusion of the lithium ions is more likely to occur. By using the map as illustrated in FIG. 6, the forgetting coefficient α can be calculated from the battery temperature TB and the SOC.

With reference again to Expression (1), an increment D(+) of the evaluation value D represents enlargement in the deviation of the salt concentration distribution due to charge and discharge during the period from the previous evaluation value calculation to the current evaluation value calculation (during the control period ΔT). More specifically, the increment D(+) is calculated using an electric current coefficient β, a limit threshold γ, and the electric current IB as in Expression (3) stated below, for example.

$$D(+)=(\beta/\gamma) \times IB \times \Delta T \quad (3)$$

Although detailed description is not repeated, as in the case of the forgetting coefficient α, correlation of the electric current coefficient β and the limit threshold γ relative to the battery temperature TB and the SOC is also acquired by an experiment or a simulation in advance, and the correlation is stored in the memory 302 as a map or a transformation. Consequently, the electric current coefficient β and the limit threshold γ can be calculated from the battery temperature TB and the SOC (see, for example, Japanese Patent Application Publication No. 2015-131573). Thus, the evaluation value D(N) is calculated in consideration of both the enlargement and the decrease in the deviation of the salt concentration distribution, which makes it possible to adequately reflect a change in the deviation of the salt concentration distribution on the evaluation value D(N).

In order to estimate the progress state of the high-rate deterioration of the battery 100, the ECU 300 integrates evaluation values D(N) of all the integers to calculate an integrated evaluation value ΣD(N). More specifically, as stated below in Expression (4), an integrated evaluation value ΣD(N−1) in the range of an initial value D(0) of the evaluation value D to an evaluation value D(N−1) at (N−1)th control period is multiplied by a damping coefficient δ, and then an evaluation value D(N) at the Nth control period is added thereto.

$$\Sigma D(N)=\delta \times \Sigma D(N-1)+D(N) \quad (4)$$

The damping coefficient δ is a coefficient defined in consideration of decrease in the deviation of the salt concentration distribution due to diffusion of the lithium ions with lapse of time. The damping coefficient δ is acquired by an experiment or a simulation in advance, and is stored in the memory 302. The integrated evaluation value ΣD (N) can be regarded as "the evaluation value" according to the present disclosure.

<Solidification of Electrolyte>

Generally, under the very low temperature (for example, −30° C. or less) environment, the electrolyte of the battery can be solidified. When the electrolyte is solidified, it is desirable to restrict charge and discharge of the battery in order to protect the battery. In the present embodiment, a threshold temperature Tth is set as a measure for protecting the battery 100. When the battery temperature TB is equal to or more than the threshold temperature Tth, the ECU 300 determines that the electrolyte is not solidified and therefore permits charge and discharge of the battery 100, whereas when the battery temperature TB is less than the threshold temperature Tth, the ECU 300 determines that the electrolyte may possibly be solidified and therefore restricts the charge and discharge of the battery 100. In setting the threshold temperature Tth, using a fixed value predetermined in accordance with the configuration of the battery 100 may also be considered. However, a freezing point Tf of the electrolyte is dependent on salt concentration C of the electrolyte as described below.

Figure 7:
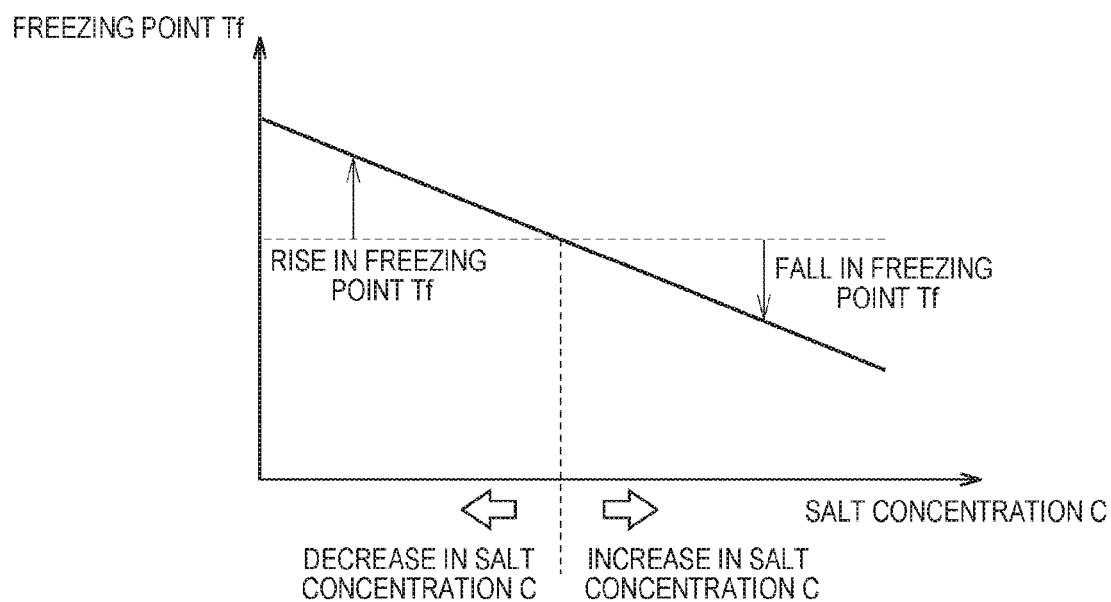
FIG. 7 is an explanatory view of relation between salt concentration and a freezing point of an electrolyte.

FIG. 7 is an explanatory view of relation between the salt concentration C and the freezing point Tf of the electrolyte. In FIG. 7, a horizontal axis represents the salt concentration C and a vertical axis represents the freezing point Tf. According to the principle of the freezing-point depression, when the salt concentration C is higher, the amount of depression of the freezing point becomes larger and the freezing point Tf becomes lower. Accordingly, when a deviation is generated in the salt concentration distribution inside the electrode body 115, the freezing point Tf may be different for each region in the electrode body 115. That is, the freezing point Tf drops in the region where the salt concentration C increases (the region in the vicinity of the center of the region K in the example illustrated in FIG. 5), while the freezing point Tf rises in the region where the salt concentration C decreases (the region in the vicinity of both the ends of the region K). Accordingly, with a fall of the battery temperature TB, the electrolyte may possibly start to solidify at a region where the salt concentration is relatively low (the lowest).

Thus, when a fixed value is used as the threshold temperature Tth without consideration of the fact that the freezing point Tf can be changed due to the deviation of the salt concentration distribution, and the threshold temperature Tth is set to be too high, the battery 100 can be protected but the charge and discharge of the battery 100 may possibly be restricted (for example, prohibited) although the electrolyte is not solidified at all. If the charge and discharge of the battery 100 used as an in-vehicle battery are prohibited, there is a possibility that travel performance of the vehicle 1 may deteriorate (for example, the vehicle 1 may become unable to travel).

In contrast, when the threshold temperature Tth is set to be too low, there is a possibility that the charge and discharge of the battery 100 may be performed although there is a region where the electrolyte is solidified. In this case, charge and discharge current concentrates on the region where the electrolyte is not solicited (the region where the salt concentration C is relatively high), which may further promote deterioration of the battery 100.

Accordingly, the first embodiment adopts a configuration in which the threshold temperature Tth is adjusted in accordance with the integrated evaluation value $\Sigma D$ of the high-rate deterioration calculated as described before. To be more specific, since the integrated evaluation value $\Sigma D$ is calculated in consideration of the salt concentration distribution, the inventors of the present disclosure have paid attention to the point that correlation (described later) is present between the integrated evaluation value ED and "minimum salt concentration Cmin" that is the lowest salt concentration inside the electrode body 115. In the first embodiment, as the integrated evaluation value $\Sigma D$ is larger and the deviation of the salt concentration distribution is larger, the minimum salt concentration Cmin, which is the salt concentration of the region where the solidification of the electrolyte is most likely to occur, is lower, and therefore the threshold temperature Tth is set to be higher. If the threshold temperature Tth is set by paying attention to the salt concentration of the region where the solidification of the electrolyte is most likely to occur as described before, it becomes possible to suppress deterioration of the battery 100 while avoiding excessive restriction in the charge and discharge of the battery 100 as described later in detail.

Figure 8:
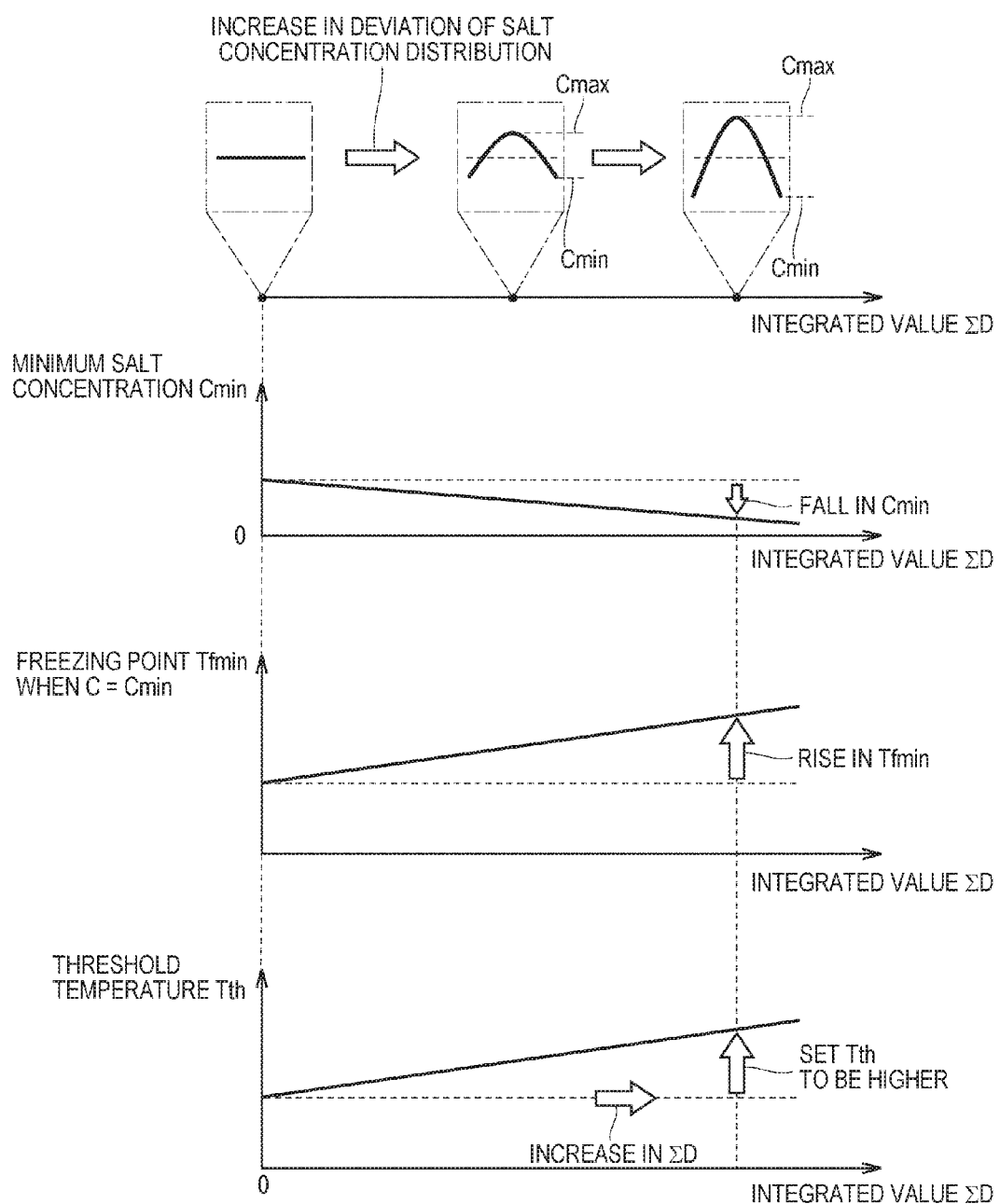
FIG. 8 is an explanatory view of a method for setting a threshold temperature corresponding to an integrated evaluation value of high-rate deterioration.

FIG. 8 is an explanatory view of a method for setting the threshold temperature Tth corresponding to the integrated evaluation value $\Sigma D$ of the high-rate deterioration. In FIG. 8, a horizontal axis represents the integrated evaluation value $\Sigma D$ (although the integrated evaluation value $\Sigma D$ can take both positive and negative values, an absolute value of the integrated evaluation value $\Sigma D$ is simply stated as an integrated evaluation value $\Sigma D$ for the sake of simplification). A vertical axis represents, in order from the top, the minimum salt concentration Cmin, "freezing point Tfmin" that is the freezing point at a region where the salt concentration C is the lowest (the region where the salt concentration C=minimum salt concentration Cmin), and the threshold temperature Tth.

When the integrated evaluation value $\Sigma D$ becomes larger and a deviation (for example, a difference between the maximum salt concentration Cmax and the minimum salt concentration Cmin) of the salt concentration distribution inside the electrode body 115 increases, the minimum salt concentration Cmin decreases as illustrated in FIG. 8 since a mean value of the salt concentration C in the entire region is approximately constant. As illustrated in FIG. 8, as the minimum salt concentration Cmin is lower, the freezing point Tfmin becomes higher and local solidification of the electrolyte becomes more likely to occur. Therefore, in the first embodiment, the threshold temperature Tth is monotonously increased with the increase in the integrated evaluation value $\Sigma D$ in the same way that the freezing point Tfmin monotonously increases with the increase in the integrated evaluation value $\Sigma D$ (see FIG. 8). Furthermore, the threshold temperature Tth is set to be higher than the freezing point Tfmin in each integrated evaluation value $\Sigma D$.

Thus, according to the first embodiment, the threshold temperature Tth is set in accordance with the minimum salt concentration Cmin that is the salt concentration of the region where solidification of the electrolyte is most likely to occur. When the battery temperature TB is equal to or more than the threshold temperature Tth, the battery temperature TB is higher than the freezing point Tfmin, and so the electrolyte is not solidified at all. Therefore, the charge and discharge of the battery 100 are permitted. This makes it possible to avoid excessive restriction of the charge and discharge of the battery 100.

Meanwhile, when the battery temperature TB is less than the threshold temperature Tth (i.e., the temperature set in accordance with the minimum salt concentration Cmin of the region where solidification of the electrolyte is most likely to occur), the battery temperature TB may possibly become the freezing point Tfmin or below. That is, there is a possibility that at least part of the electrolyte may locally be solidified. Therefore, the charge and discharge of the battery 100 are restricted. As a result, deterioration of the battery 100 can be suppressed.

FIG. 8 illustrates an example in which the minimum salt concentration Cmin, the freezing point Tfmin, and the threshold temperature Tth linearly change with the increase in the integrated evaluation value $\Sigma D$. However, the minimum salt concentration Cmin may decrease, for example, like a curve, as long as it monotonously decreases with the increase in the integrated evaluation value $\Sigma D$. The freezing point Tfmin and the threshold temperature Tth may increase, for example, like a curve, as long as they monotonously increase with the increase in the integrated evaluation value $\Sigma D$. Or it is also possible to increase the threshold temperature Tth stepwise with the increase in the integrated evaluation value $\Sigma D$. The same rule also applies to a map illustrated in FIG. 10, 15 or 18 described below.

<Charge and Discharge Control Flow of Battery>

A detailed description is now given of processing procedures for the ECU 300 to set the threshold temperature Tth and to control the charge and discharge of the battery 100 in accordance with the threshold temperature Tth with reference to flowcharts.

Figure 9:
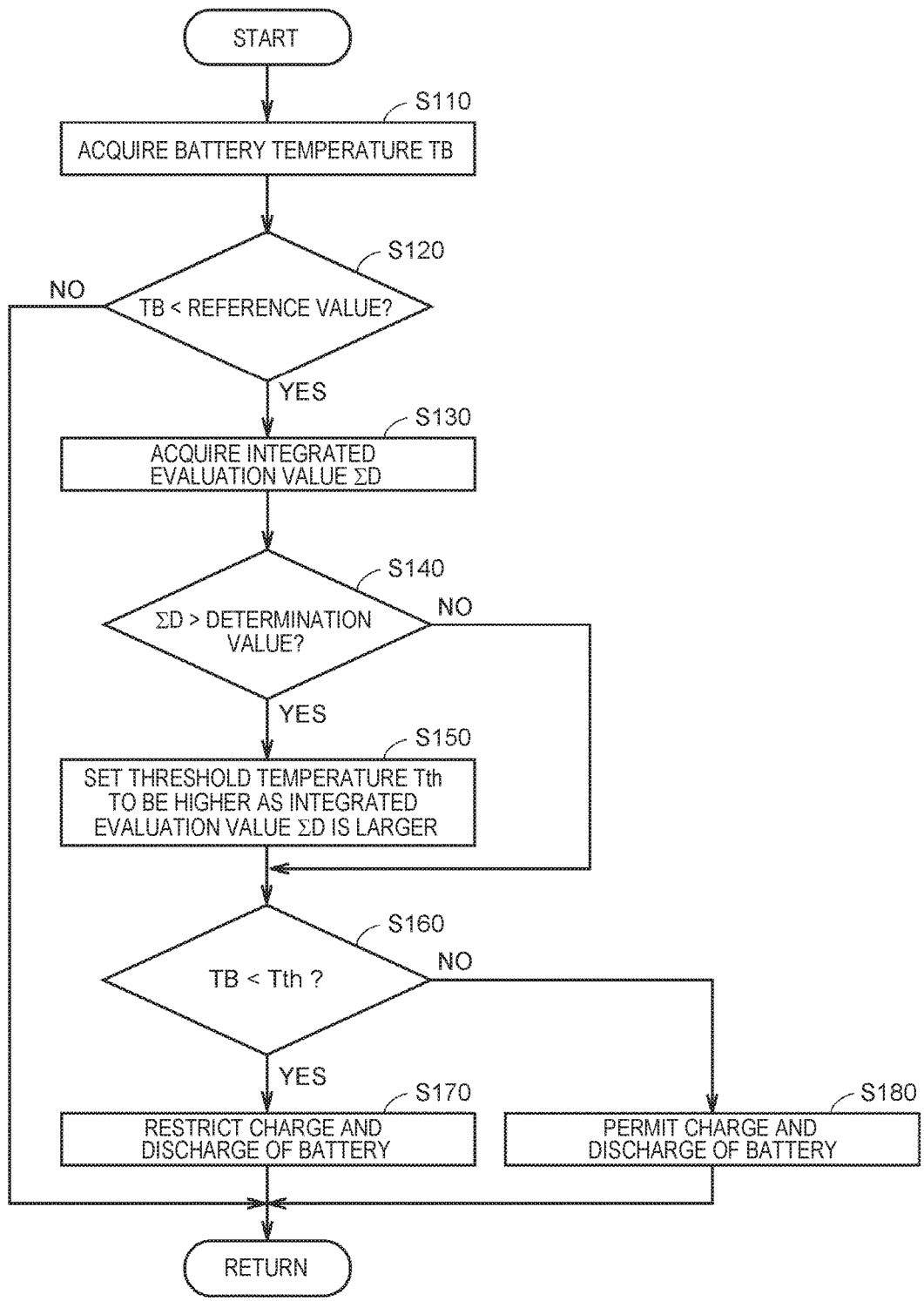
FIG. 9 is a flowchart for describing the charge and discharge control of the battery in the first embodiment.

FIG. 9 is a flowchart for describing the charge and discharge control of the battery 100 in the first embodiment. The flowcharts illustrated in FIG. 9, and FIGS. 11, 16, and 19 described later are called from a main routine and executed every predetermined period or whenever a predetermined condition is satisfied. Each of the steps (abbreviated to "S") included in the flowcharts may basically be implemented by software processing performed by the ECU 300. However, some or all of the steps may be implemented by hardware (an electrical circuit) fabricated in the ECU 300.

In S110, the ECU 300 acquires a battery temperature TB from the temperature sensor 103. In S120, the ECU 300 determines whether or not the battery temperature TB is less than a specified reference value. The reference value is set as a temperature at which the electrolyte of the battery 100 is possibly solidified (a very low temperature that is higher than the threshold temperature Tth). When the battery temperature TB is the reference value or more and there is no possibility that the electrolyte may be solidified (NO in S120), the ECU 300 skips subsequent processings and returns the processing to the main routine.

The integrated evaluation value $\Sigma D$ of high-rate deterioration is calculated at predetermined periods in another routine which is not illustrated. Since the calculation method has been described in detail using Expressions (1) to (4), a description thereof is not repeated (see, for example, International Publication No. WO2013/046263, and JP 2015-131573 A). When the battery temperature TB is less than the reference value, i.e., there is a possibility that the electrolyte may be solidified (YES in S120), the ECU 300 acquires the integrated evaluation value $\Sigma D$ calculated in the other routine.

In S140, the ECU 300 determines whether or not the integrated evaluation value $\Sigma D$ (absolute value) acquired in S130 is larger than a specified determination value. The determination value is set, based on an experiment or a simulation, to a value indicative of the high-rate deterioration of the battery 100 that may possibly influence the freezing point Tf. When the integrated evaluation value $\Sigma D$ is larger than the determination value (YES in S140), the ECU 300 determines that the high-rate deterioration of the battery 100 may possibly influence the freezing point Tf, and therefore corrects the threshold temperature Tth in S150 described below.

In S150, the ECU 300 calculates the threshold temperature Tth from the integrated evaluation value $\Sigma D$ using a map (see a lowermost graph in FIG. 8) or a transformation predetermined by an experiment or a simulation. Accordingly, when the integrated evaluation value $\Sigma D$ is larger, the threshold temperature Tth is set to be higher since the minimum salt concentration Cmin becomes lower.

Although the example of directly converting the threshold temperature Tth from the integrated evaluation value $\Sigma D$ has been described in S150, the ECU 300 may perform following two processings in sequence. That is, the ECU 300 may calculate the minimum salt concentration Cmin from the integrated evaluation value $\Sigma D$ using a map (see an uppermost graph in FIG. 8) or a transformation, and may further calculate the threshold temperature Tth from the minimum salt concentration Cmin using another map (not illustrated) or transformation.

When the integrated evaluation value $\Sigma D$ is equal to or less than the threshold in S140 (NO in S140), the ECU 300 determines that the high-rate deterioration of the battery 100 has not progressed enough to influence the freezing point Tf of the electrolyte, and shifts the processing to S160 with the processing of S150 being skipped. In this case, a predetermined fixed value is used as the threshold temperature Tth. However, since the processing of S140 is not essential, processing of S150 may be executed after the processing of S130 as a routine.

In S160, the ECU 300 determines whether or not the battery temperature TB acquired in S110 is less than the threshold temperature Tth. When the battery temperature TB is equal to or more than the threshold temperature Tth (NO in S160), the ECU 300 permits charge and discharge of the battery 100 (S180), whereas when the battery temperature TB is less than the threshold temperature Tth (YES in S160), the ECU 300 restricts the charge and discharge of the battery 100 (S170). As a restriction of the charge and discharge, the magnitude of the electric current IB may be restricted to be a value equal to or less than a predetermined value (a value small enough to suppress high-rate deterioration), or the charge and discharge may completely be prohibited. Then, the ECU 300 returns the processing to the main routine.

As described in the foregoing, according to the first embodiment, the threshold temperature Tth is set in consideration that the deviation of the salt concentration distribution may cause an uneven distribution of the freezing point Tf and may make the freezing points Tfmin of respective regions in the electrode body 115 different from each other. Specifically, when the integrated evaluation value $\Sigma D$ (absolute value) is larger, the threshold temperature Tth is set to be higher since the minimum salt concentration Cmin becomes lower.

When the battery temperature TB is equal to or more than the threshold temperature Tth, it is determined that the battery temperature TB is higher than the freezing point Tfmin, and so the electrolyte is not solidified. Therefore, the charge and discharge of the battery 100 is permitted. This makes it possible to avoid excessive restriction of the charge and discharge of the battery 100. When the battery temperature TB is less than the threshold temperature Tth, it is determined that there is a possibility that the battery temperature TB may be lower than the freezing point Tfmin and at least part of the electrolyte may locally be solidified. Therefore, the charge and discharge of the battery 100 is restricted. As a result, deterioration of the battery 100 can be suppressed.

Modification of First Embodiment

Generally, internal resistance of a battery becomes larger, as high-rate deterioration of the battery progresses (see, for example, Japanese Patent Application Publication No. 2013-125713). Therefore, it is also possible to estimate the progress state of the high-rate deterioration based on an internal resistance R of the battery 100 in place of the integrated evaluation value $\Sigma D$. In a first modification of the first embodiment, an example of setting the threshold temperature Tth from the internal resistance R using a map that defines correlation between the internal resistance R and the threshold temperature Tth will be described.

Figure 10:
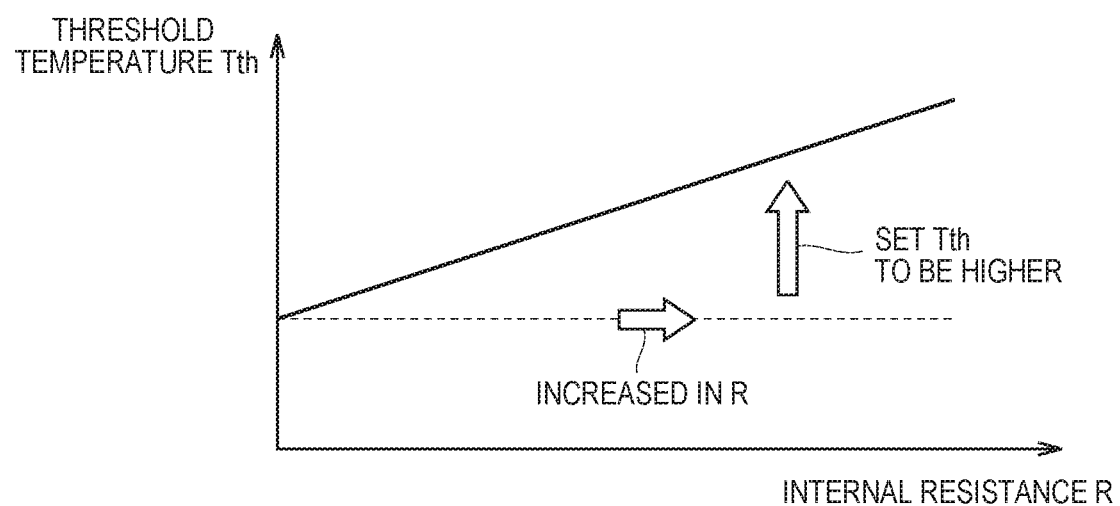
FIG. 10 illustrates one example of a map that defines correlation between internal resistance and the threshold temperature.

FIG. 10 illustrates one example of a map that defines correlation between the internal resistance R and the threshold temperature Tth. In FIG. 10, a horizontal axis represents the internal resistance R and a vertical axis represents the threshold temperature Tth. When the internal resistance R is higher, it indicates more progress in the high-rate deterioration and a larger deviation of the salt concentration distribution. In this case, the minimum salt concentration Cmin becomes lower. Consequently, by using a map predetermined by an experiment or a simulation as illustrated in FIG. 10, the threshold temperature Tth is set to be higher as the internal resistance R is higher.

Figure 11:
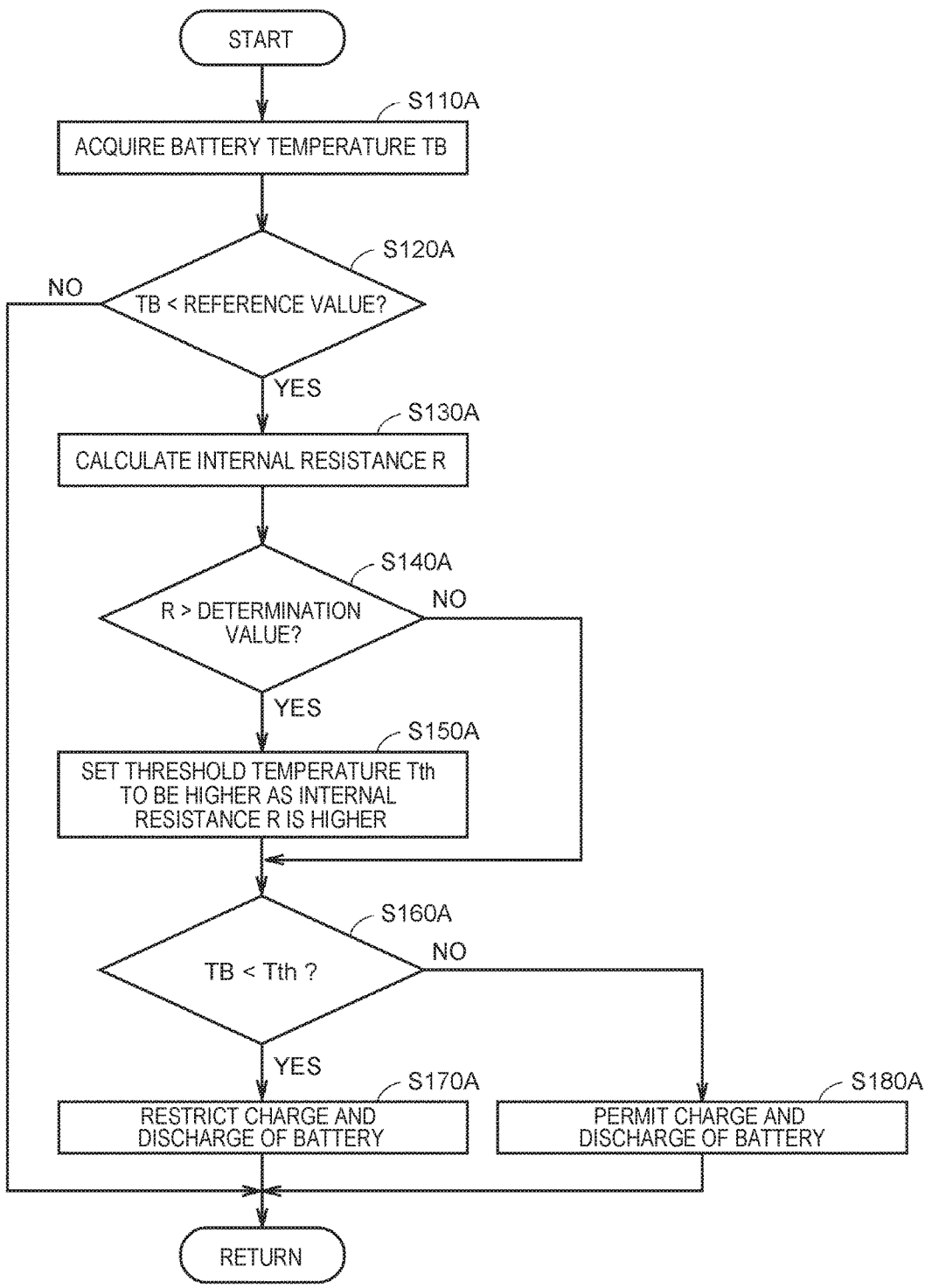
FIG. 11 is a flowchart for describing the charge and discharge control of the battery in a modification of the first embodiment.

FIG. 11 is a flowchart for describing the charge and discharge control of the battery 100 in the modification of the first embodiment. Since the processings of S110A and S120A are equivalent to the processings of S110 and S120 (see FIG. 9) in the first embodiment, respectively, a description thereof is not repeated.

When the battery temperature TB is less than a reference value in S120A (YES in S120A), the ECU 300 calculates an internal resistance R of the battery 100 (S130A). The internal resistance R is calculable from the voltage VB, the electric current IB, and the battery temperature TB by using a publicly known method.

In S140A, the ECU 300 determines whether or not the internal resistance R calculated in S130A is higher than a specified determination value. When the internal resistance R is higher than the determination value (YES in S140A), the ECU 300 determines that the high-rate deterioration of the battery 100 may possibly influence the freezing point Tf, and calculates the threshold temperature Tth from the internal resistance R using a specified map (see FIG. 10) or a transformation (S150A). Accordingly, when the internal resistance R is higher, the threshold temperature Tth is set to be higher since the minimum salt concentration Cmin becomes lower. Since processings of subsequent steps S160A to S180A are equivalent to the processings of S160 to S180 in the first embodiment, respectively, a description thereof is not repeated.

As described in the foregoing, according to the modification of the first embodiment, the threshold temperature Tth is set based on the internal resistance R by using the fact that the progress degree of the high-rate deterioration of the battery 100 (in other words, the magnitude of a deviation of the salt concentration distribution) can be estimated based on the internal resistance R. Specifically, when the internal resistance R is higher, the threshold temperature Tth is set to be higher since the minimum salt concentration Cmin becomes lower. Accordingly, it becomes possible to suppress deterioration of the battery 100 while avoiding excessive restriction of the charge and discharge of the battery 100 as in the first embodiment.

Second Embodiment

Although the first embodiment and the modification of the first embodiment have been described by using the example in which the integrated evaluation value ΣD of high-rate deterioration or the internal resistance R is used as a value related to the minimum salt concentration Cmin of the electrolyte. However, the related value is not limited to the integrated evaluation value Σ nor the internal resistance R. In the second embodiment, an example in which surface pressure of the cells 110 is used as the related value will be described. The configuration of a vehicle incorporating the secondary battery system according to the second embodiment is equivalent to the configuration of the vehicle 1 in the first embodiment.

Figure 12:
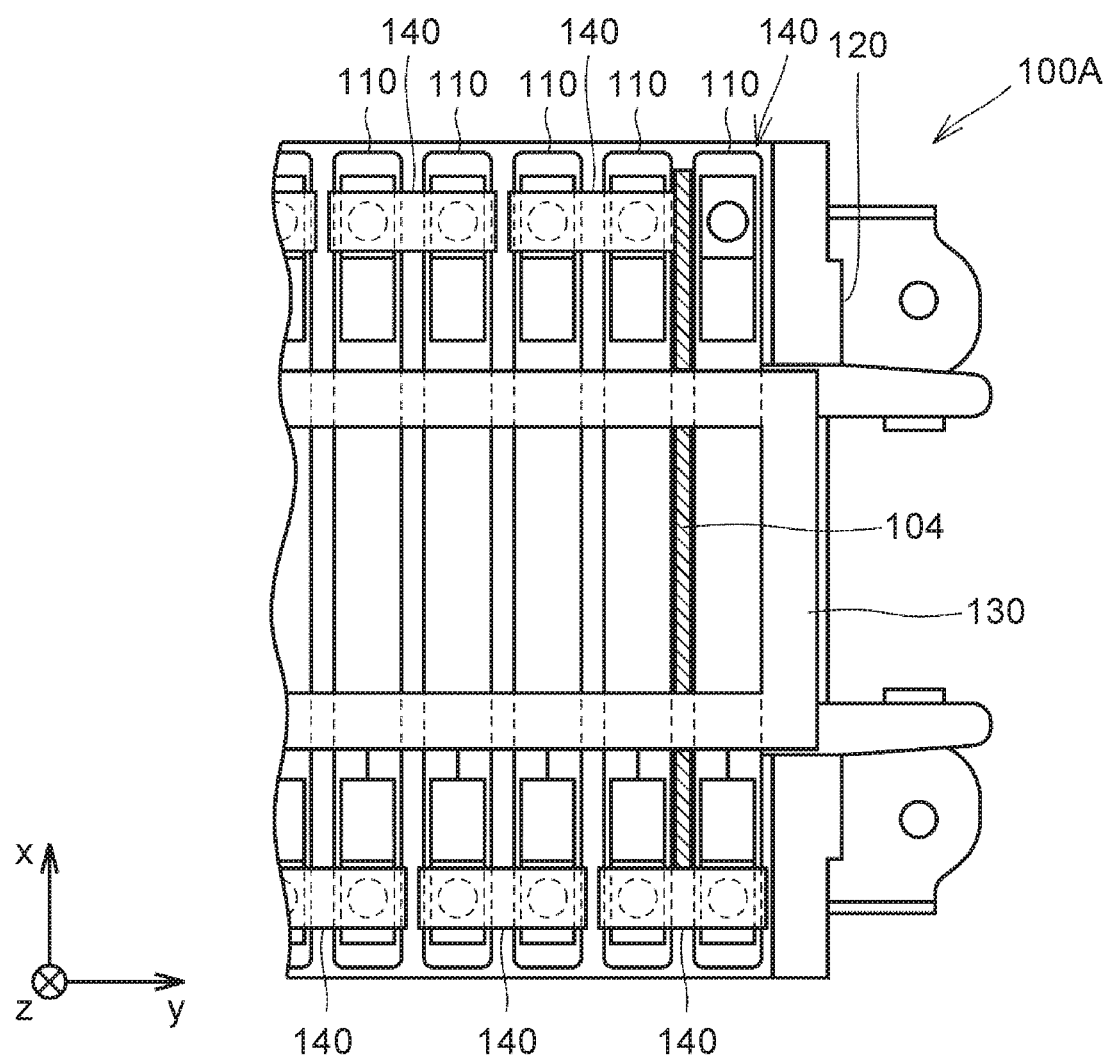
FIG. 12 illustrates the configuration of the battery in a second embodiment.

FIG. 12 illustrates the configuration of a battery 100A in the second embodiment. In the second embodiment, a surface pressure sensor 104 is provided in at least one (one in the example illustrated in FIG. 12) of the gaps between adjacent cells 110 in the laminate of the cells 110. For example, the surface pressure sensor 104 is a tactile sensor that measures surface pressure distribution of the entire lateral surface (surface parallel to the zx plane) of the cells 110, and outputs a measurement result to the ECU 300.

Figure 13:
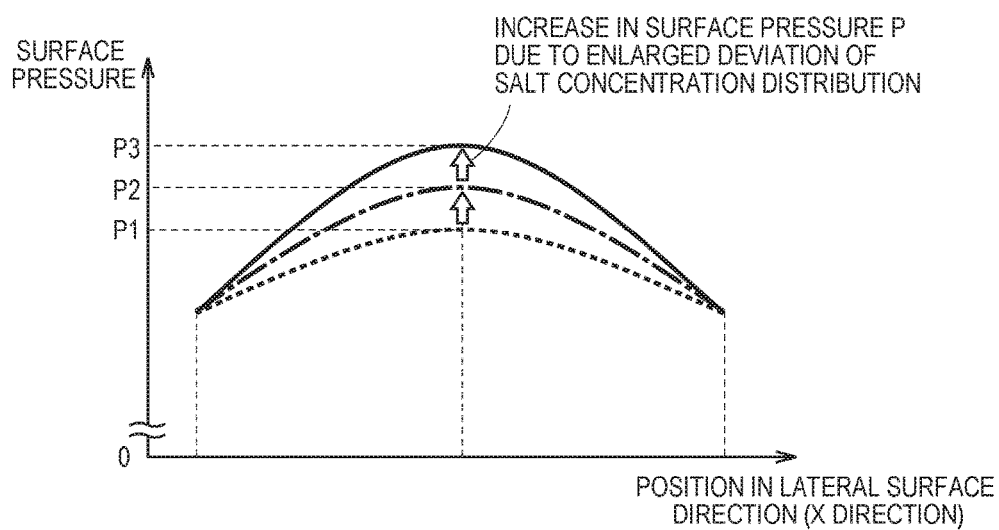
FIG. 13 illustrates one example of surface pressure distribution measured by a surface pressure sensor.

FIG. 13 illustrates one example of the surface pressure distribution measured by the surface pressure sensor 104. In FIG. 13, a horizontal axis represents a position in a lateral surface direction (x direction) of the cell 110, while a vertical axis represents the surface pressure. By using the surface pressure sensor 104, the surface pressure distribution in the lateral surface direction of the cells 110 as illustrated in FIG. 13 is measured. As a representative value of the surface pressure measured by the surface pressure sensor 104, surface pressure P (expressed as P1 to P3) of a central portion in the lateral surface direction of the cells 110 can be used, for example.

Due to the temperature change in the cells 110 or change in SOC caused by high-rate charge and discharge, change in volume of the electrode body 115 and the electrolyte may occur. Expansion or contraction of the casing 111 of the cells 110 caused by the volume change is measured as change of the surface pressure. In one example, as disclosed in FIG. 8 in Japanese Patent Application Publication No. 2014-207107, the casing 111 expands and the surface pressure P of the central portion increases as a deviation of the salt concentration distribution increases due to the excessive charging, for example. Therefore, the deviation of the salt concentration distribution can be estimated from the surface pressure P by acquiring the correlation between the surface pressure P and the deviation of the salt concentration distribution in advance. For more accurate estimation of the deviation of the salt concentration distribution (or the minimum salt concentration Cmin), it is more desirable to correct the surface pressure P as described below than to use the surface pressure P (measured value) as it is (see JP 2014-207107 A).

Figure 14:
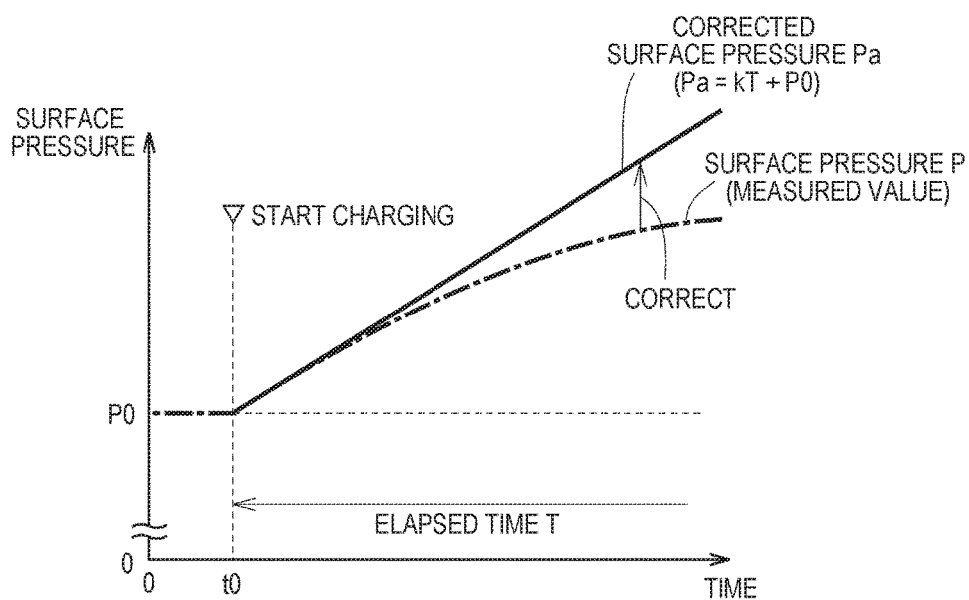
FIG. 14 is an explanatory view of a method for correcting the surface pressure.

FIG. 14 is an explanatory view of a method for correcting the surface pressure P. In FIG. 14, a horizontal axis represents elapsed time and a vertical axis represents the surface pressure. As illustrated in FIG. 14, an inclination k of a regression line of the surface pressure P in predetermined time (for example, in several tens of seconds) immediately after charging start time t0 is calculated first. Then, as indicated in Expression (5), the inclination k, elapsed time T from charging start time t0, and initial surface pressure P0 of the surface pressure P are used to calculate corrected surface pressure Pa. The correction method is only illustrative, and a value obtained by other correction methods may be adapted as the corrected surface pressure Pa.

$$Pa = kT + P0 \tag{5}$$

Figure 15:
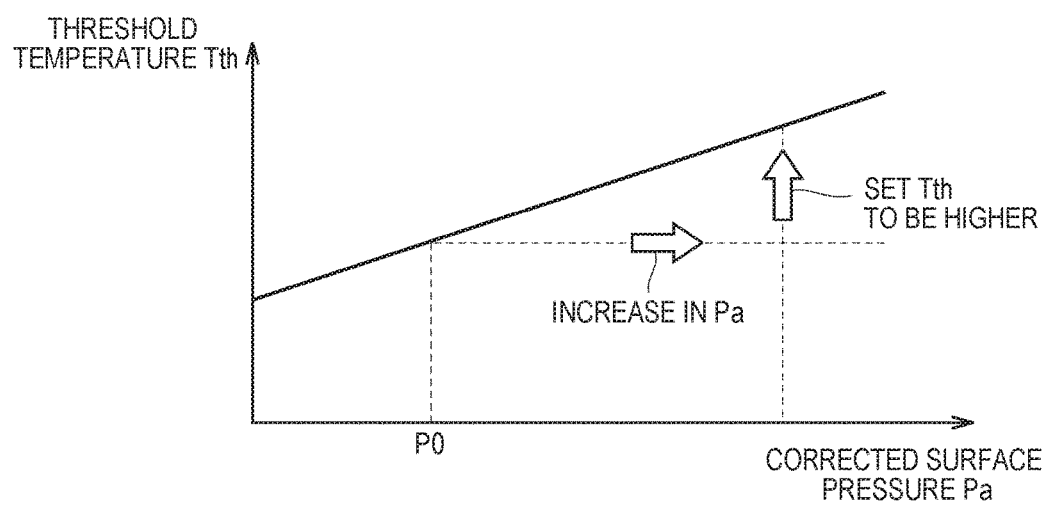
FIG. 15 illustrates one example of a map that defines correlation between corrected surface pressure and the threshold temperature.

FIG. 15 illustrates one example of a map that defines correlation between the corrected surface pressure Pa and the threshold temperature Tth. In FIG. 15, a horizontal axis represents the corrected surface pressure Pa, and a vertical axis represents the threshold temperature Tth. By using a map (or transformation) as illustrated in FIG. 15, the threshold temperature Tth is set to be higher, as the minimum salt concentration Cmin becomes lower when the corrected surface pressure Pa is higher.

Figure 16:
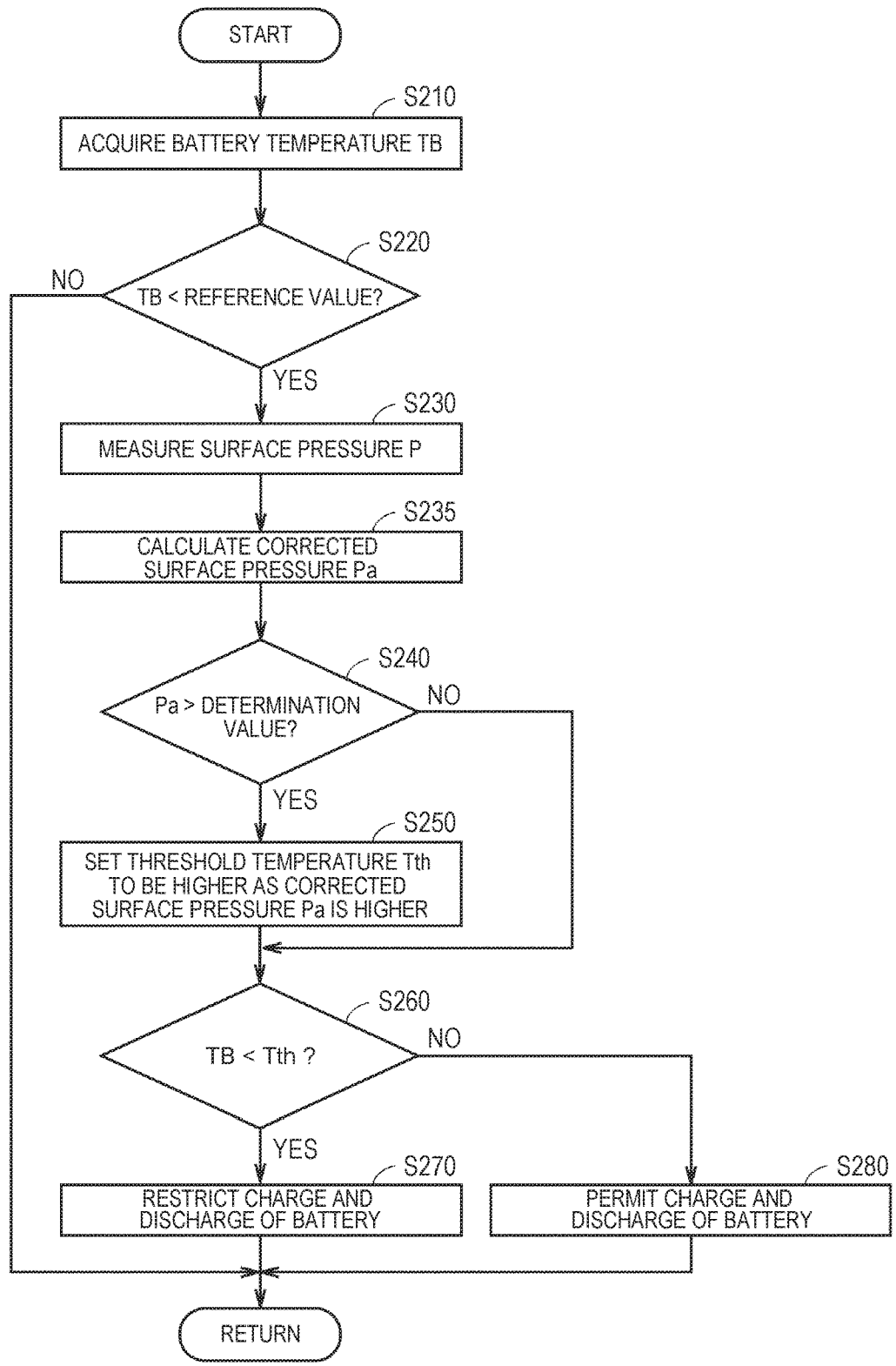
FIG. 16 is a flowchart for describing the charge and discharge control of the battery in the second embodiment.

FIG. 16 is a flowchart for describing the charge and discharge control of the battery 100A in the second embodiment. Since the processings of S210 and S220 are equivalent to the processings of S110 and S120 (see FIG. 9) in the first embodiment, respectively, a description thereof is not repeated.

In S220, when the battery temperature TB is less than the reference value, so that the electrolyte may possibly be solidified (YES in S220), the ECU 300 measures the surface pressure P of the cells 110 using the surface pressure sensor 104 (S230). Furthermore, in S235, the ECU 300 corrects the surface pressure P to calculate a corrected surface pressure Pa (see FIG. 14).

In S240, the ECU 300 determines whether or not the corrected surface pressure Pa calculated in S230 is higher than a specified determination value. When the corrected surface pressure Pa is higher than the determination value (YES in S240A), the ECU 300 determines that the deviation of the salt concentration distribution is large and the large deviation may possibly influence the freezing point Tf.

Accordingly, the ECU 300 calculates the threshold temperature Tth from the corrected surface pressure Pa using the specified map (see FIG. 15) or transformation (S250). Accordingly, the threshold temperature Tth is set to be higher as the corrected surface pressure Pa is higher. Since processings of subsequent steps S260 to S280 are equivalent to the processings of S160 to S180 in the first embodiment, respectively, a description thereof is not repeated.

As described in the foregoing, according to the second embodiment, the threshold temperature Tth is set based on the corrected surface pressure Pa using the correlation between the surface pressure (corrected surface pressure Pa) of the cells 110 and the threshold temperature Tth. Specifically, when the corrected surface pressure Pa is higher, the threshold temperature Tth is set to be higher since the minimum salt concentration Cmin becomes lower. Accordingly, it becomes possible to suppress deterioration of the battery 100 while avoiding excessive restriction of the charge and discharge of the battery 100 as in the first embodiment and the modification.

Third Embodiment

Due to the change in volume of the electrolyte and the electrode body 115 caused by high-rate charge and discharge, a flow of the electrolyte may be generated inside the electrode body 115. In the third embodiment, a description is given of a configuration of calculating salt concentration distribution of lithium ions inside the electrode body 115 by a fluid simulation on the vehicle 1 and calculating the minimum salt concentration Cmin based on the calculation result (see, for example, see Japanese Patent Application Publication No. 2015-127991). The configuration of a vehicle incorporating the secondary battery system according to the third embodiment is equivalent to the configuration of the vehicle 1 in the first embodiment.

More specifically, a flow velocity of the electrolyte is calculated by constructing a model of the electrode body 115 and then solving an equation (liquid flow equation) that defines the flow of the electrolyte based on hydrodynamics for each of the positive electrode sheet 116, the negative electrode sheet 117, and the separator 118. Based on the calculated flow velocity, salt concentration distribution is then further calculated.

Figure 17:
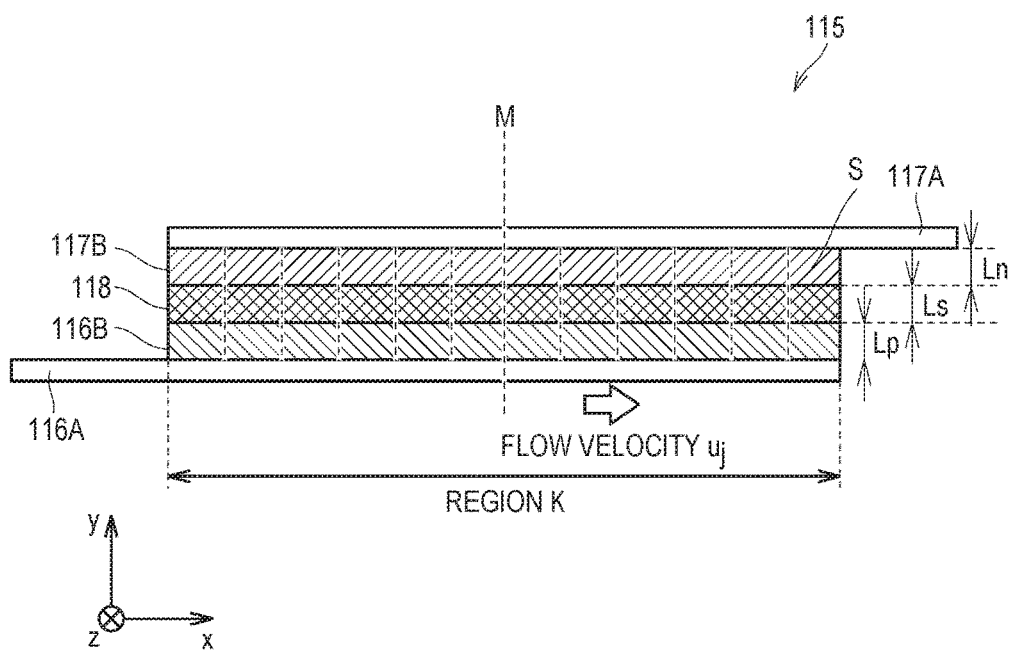
FIG. 17 is an explanatory view illustrating one example of a model of the electrode body.

FIG. 17 is an explanatory view illustrating one example of the model of the electrode body 115. The electrode body 115 expands or contracts in accordance with a change in the battery temperature TB or the SOC. When the electrode body 115 expands, a thickness Lp of the positive electrode active material layer 116B increases. If the volume of the active material in the positive electrode active material layer 116B is assumed to be constant, the electrolyte flows more easily inside the positive electrode active material layer 116B as the thickness Lp of the positive electrode active material layer 116B becomes larger. When the electrode body 115 expands, the electrolyte flows from a central portion M toward both ends of the positive electrode active material layer 116B. When the electrode body 115 contracts, the electrolyte flows from both the ends toward the central portion M of the positive electrode active material layer 116B. The same rule also applies to the negative electrode active material layer 117B and the separator 118.

The positive electrode sheet 116 (positive electrode active material layer 116B), the negative electrode sheet 117 (negative electrode active material layer 117B), and the separator 118 are each virtually divided into a plurality of minute regions S along the in-plane direction (x direction). A flow velocity is calculated for each of the plurality of minute regions S based on Expressions (6) and (7) stated below.

$$\varepsilon_{e,j}\frac{\partial u_j}{\partial t} + \varepsilon_{e,j}(u_j \cdot \nabla)u_j = \frac{1}{\rho}(\mu\nabla^2 u_j - \mu K_j^{-1} u_j - \nabla p) \quad (6)$$

$$(j = p, n, s)$$

$$\frac{\partial(\rho\varepsilon_{e,j})}{\partial t} + \nabla \cdot (\rho u_j) = 0 \quad (j = p, n, s) \quad (7)$$

Expression (6), which is an equation that defines a liquid flow at time t, is known as Navier-Stokes equation. Expression (7) is a continuity equation concerning the law of mass conservation of the electrolyte. In Expressions (6) and (7), $u_j$ represents the flow velocity of the electrolyte, $\rho$ represents density of the electrolyte, $\mu$ represents viscosity of the electrolyte, $K_j$ represents a transmission coefficient, p represents pressure of the electrolyte, and $\varepsilon_{e,j}$ represents a volume fraction of the electrolyte. The flow velocity $u_j$ and the pressure p are unknown.

A subscript j given to each parameter including the flow velocity $u_j$, the transmission coefficient $K_j$, and the volume fraction $\varepsilon_{e,j}$ is used to distinguish the positive electrode sheet 116, the negative electrode sheet 117, and the separator 118. That is, when j=p, it signifies that the pertinent parameter relates to the positive electrode sheet 116. When j=n, it signifies that the pertinent parameter relates to the negative electrode sheet 117. When j=s, it signifies that the pertinent parameter relates to the separator 118. The subscript j is also used for a later-described parameter (salt concentration $c_{e,j}$), and signifies the same thing. The volume fraction $\varepsilon_{e,j}$ means a ratio of the volume of the electrolyte in a component j to the entire volume of the component j.

Among these parameters, the transmission coefficient $K_j$, and the density $\rho$, viscosity $\mu$, and volume fraction $\varepsilon_{e,j}$ of the electrolyte take values corresponding to the battery temperature TB and the SOC. For example, the transmission coefficient $K_j$ can be obtained in advance for each battery temperature TB and SOC by measuring the flow velocity of a flow generated when a pressure difference between both sides of the component j is a specified reference value.

The flow velocity $u_j$ is theoretically calculable by forming Expressions (6) and (7) into a simultaneous equation. However, in most cases, arithmetic capacity is insufficient in typical vehicle ECUs. Accordingly, it is desirable to perform various approximation to simplify Expressions (6) and (7) in order to reduce an arithmetic amount. When the flow velocity $u_j$ is calculated in this way from Expressions (6) and (7), then the salt concentration $c_{e,j}$ in the electrolyte can be calculated based on Expressions (8) and (9) stated below.

$$\frac{\partial(\varepsilon_{e,j}c_{e,j})}{\partial t} + u_j \cdot \nabla\varepsilon_{e,j}c_{e,j} = \nabla\left(D_{e,j}^{\text{eff}}\nabla c_{e,j}\right) + \frac{1-t_+^0}{F}\frac{IB}{L_j} \quad (8)$$

$$(j = p, n)$$

$$\frac{\partial(\varepsilon_{e,s}c_{e,s})}{\partial t} + u_s \cdot \nabla\varepsilon_{e,s}c_{e,s} = \nabla(D_{e,s}^{\text{eff}}\nabla c_{e,s}) \quad (9)$$

Expression (8) is a convective diffusion equation relating to the positive electrode sheet 116 or the negative electrode sheet 117, and Expression (9) is a convective diffusion equation relating to the separator 118. In Expressions (8) and (9), a first term on the left side defines change in the salt concentration in predetermined time. A second term on the left side defines change in the salt concentration dependent on the flow velocity $u_j$ of the electrolyte. A first term on the right side defines a diffusion state of salt in the electrolyte. An effective diffusion coefficient of the electrolyte is represented by $D_{e,j}^{\mathit{eff}}$. In Expression (8), a second term on the right side defines a generated amount of salt in the electrolyte. A transference number of salt in the electrolyte is represented by $t+^0$. F represents a Faraday constant.

For each of the minute regions S of the positive electrode sheet 116, a salt concentration $c_{e,p}$ in each of the minute regions S is calculated by substituting the flow velocity $u_p$ of the electrolyte calculated from Expressions (6) and (7) into Expression (8). The same calculation process is executed for the negative electrode sheet 117. For each of the minute regions S of the separator 118, a salt concentration $c_{e,s}$ of each of the minute regions S is calculated by substituting the flow velocity $u_s$ of the electrolyte calculated from Expressions (6) and (7) into Expression (9). The salt concentration $c_{e,j}$ in each of the minute regions S (i.e., the salt concentration distribution) is calculated in this way, so that a minimum value among the thus-calculated values may be used as the minimum salt concentration Cmin, for example.

Figure 18:
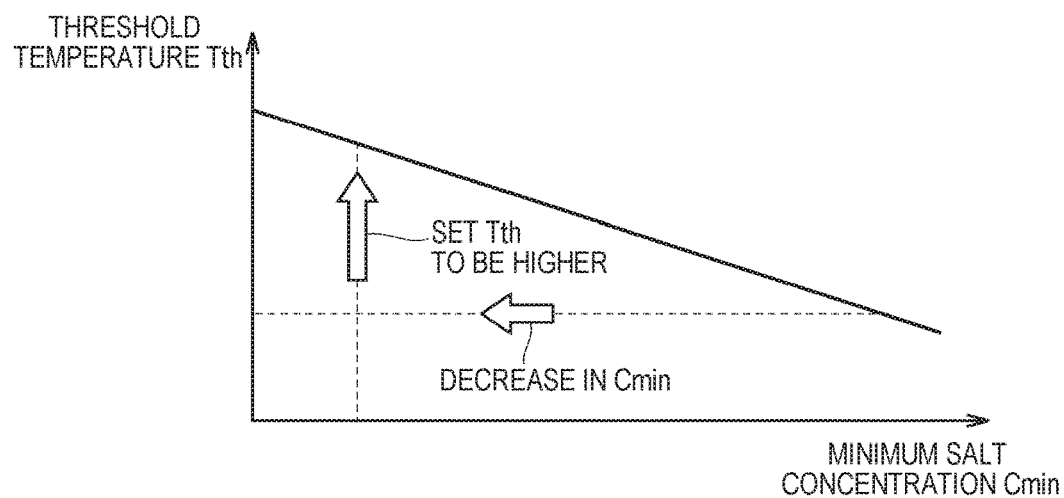
FIG. 18 illustrates one example of a map that defines correlation between minimum salt concentration and the threshold temperature.

FIG. 18 illustrates one example of a map that defines correlation between the minimum salt concentration Cmin and the threshold temperature Tth. In FIG. 18, a horizontal axis represents the minimum salt concentration Cmin and a vertical axis represents the threshold temperature Tth. By using a map (or transformation) as illustrated in FIG. 18, the threshold temperature Tth is set to be higher, as the minimum salt concentration Cmin is lower.

Figure 19:
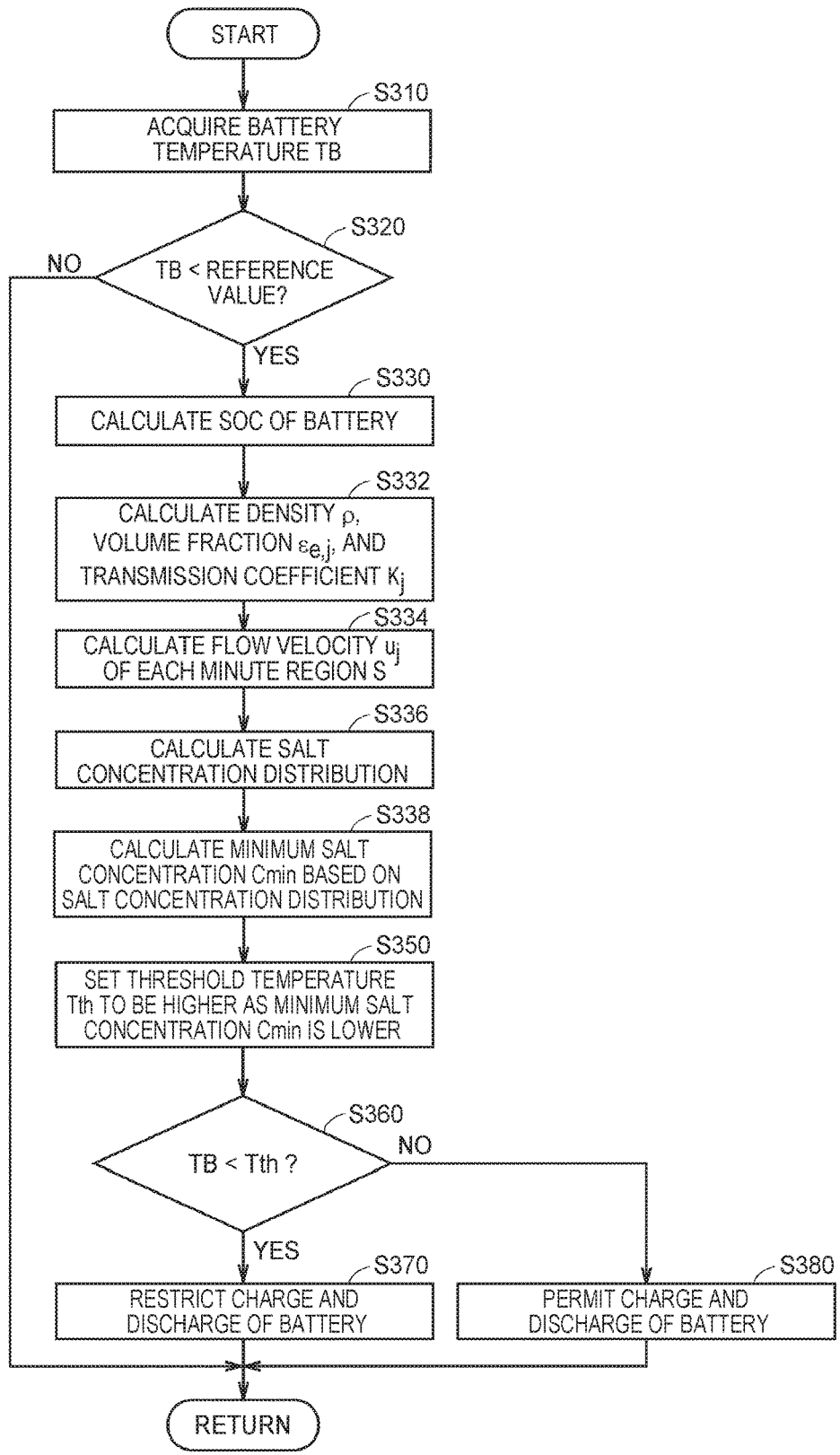
FIG. 19 is a flowchart for describing the charge and discharge control of the battery in a third embodiment.

FIG. 19 is a flowchart for describing the charge and discharge control of the battery 100 in the third embodiment. Since processings of S310 and S320 are equivalent to the processings of S110 and S120 (see FIG. 9) in the first embodiment, respectively, a description thereof is not repeated.

In S220, when the battery temperature TB is less than the reference value and so the electrolyte may possibly be solidified (YES in S220), the ECU 300 executes processing of subsequent steps S330 to S338 to calculate the minimum salt concentration Cmin.

Specifically, in S330, the ECU 300 calculates SOC of the battery 100. Furthermore, in S332, the ECU 300 reads from the memory 302 values of the density p, volume fraction $\varepsilon_{e,j}$, and transmission coefficient $K_j$ (j=p, n, s) of the electrolyte set in accordance with the battery temperature TB and the SOC. Then, in S334, the ECU 300 calculates the flow velocity $u_j$ (j=p, n, s) of the electrolyte using Expressions (6) and (7).

In S336, the ECU 300 calculates the salt concentration $c_{e,j}$ (salt concentration distribution) of each minute region S of the positive electrode sheet 116 and the negative electrode sheet 117 by substituting the flow velocity $u_j$ (j=p, n) calculated in S334 into Expression (8). The ECU 300 also calculates the salt concentration $c_{e,s}$ (salt concentration distribution) of each minute region S of the separator 118 by substituting the flow velocity $u_s$ into Expression (9). In S338, the ECU 300 further calculates the minimum salt concentration Cmin from the salt concentration distribution of the electrolyte.

In S350, the ECU 300 calculates the threshold temperature Tth from the minimum salt concentration Cmin using a specified map (see FIG. 18) or a transformation. Accordingly, the threshold temperature Tth is set to be higher as the minimum salt concentration Cmin is lower. Since processings of subsequent steps S360 to S380 are equivalent to the processings of S160 to S180 in the first embodiment, respectively, a description thereof is not repeated.

As described in the foregoing, according to the third embodiment, the salt concentration distribution in the electrode body 115 is calculated by solving the equations (Expressions (6) to (9)) based on hydrodynamics, and the minimum salt concentration Cmin is calculated from the salt concentration distribution. Then, the threshold temperature Tth is set based on the minimum salt concentration Cmin using the correlation between the minimum salt concentration Cmin and the threshold temperature Tth. As a result, it becomes possible to suppress deterioration of the battery 100 while avoiding excessive restriction of the charge and discharge of the battery 100 as in the first and second embodiments.

In the first and second embodiments, the method has been described which uses the integrated evaluation value ΣD of the high-rate deterioration, the internal resistance R, or the surface pressure Pa as "the value related to the minimum salt concentration Cmin." In the third embodiment, the method has been described which calculates the minimum salt concentration Cmin from the salt concentration distribution by a fluid simulation. However, the value related to the minimum salt concentration Cmin is not particularly limited, and any value correlated with the minimum salt concentration Cmin may be used. Or the minimum salt concentration Cmin may be measured more directly. For example, a plurality of ion sensors are provided inside the electrode body 115 to measure the salt concentration C of each region, and a minimum value among the measured salt concentration C may be used as the minimum salt concentration Cmin.

It should be understood that the embodiments disclosed are in all respects illustrative and are not considered as the basis for restrictive interpretation.

What is claimed is:

1. A secondary battery system, comprising:
   a secondary battery having an electrode body impregnated with an electrolyte containing lithium ions; and
   a control unit configured to permit charge and discharge of the secondary battery when temperature of the secondary battery is equal to or more than a threshold temperature and to restrict the charge and discharge of the secondary battery when the temperature of the secondary battery is less than the threshold temperature, wherein
   the control unit is configured to obtain a value related to a minimum concentration of the lithium ions in a region of the secondary battery, the region having the smallest concentration of the lithium ions out of all regions in the secondary battery due to a deviation in concentration distribution of the lithium ions in the electrode body, and to set the threshold temperature to be higher as an amount of decrease in the minimum concentration becomes larger, the amount of decrease being represented by the related value.

2. The secondary battery system according to claim 1, wherein
   the control unit is configured to calculate, based on a charge and discharge history of the secondary battery, an evaluation value representing a deteriorating degree of the secondary battery attributed to the deviation of the concentration distribution caused by the charge and discharge of the secondary battery and to set the threshold temperature to be higher as the evaluation value is larger.

3. The secondary battery system according to claim 1, wherein
   the secondary battery further includes: a battery casing that houses the electrode body; and a surface pressure sensor that measures surface pressure on a surface of the battery casing, and
   the control unit is configured to set the threshold temperature to be higher as the surface pressure is higher.

4. The secondary battery system according to claim 1, wherein
the control unit is configured to calculate a flow velocity of the electrolyte using a liquid flow equation that defines a flow of the electrolyte, to calculate the concentration distribution from the flow velocity, and to calculate the minimum concentration from the calculated concentration distribution.

\* \* \* \* \*